(12) United States Patent
Diament et al.

(10) Patent No.: US 9,317,432 B2
(45) Date of Patent: Apr. 19, 2016

(54) METHODS AND SYSTEMS FOR CONSISTENTLY REPLICATING DATA

(75) Inventors: Judah M. Diament, Bergenfield, NJ (US); Arun Kwangil Iyengar, Yorktown Heights, NY (US); Thomas A. Mikalsen, Cold Spring, NY (US); Isabelle Marie Rouvellou, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1909 days.

(21) Appl. No.: 11/971,607

(22) Filed: Jan. 9, 2008

(65) Prior Publication Data
US 2009/0177841 A1 Jul. 9, 2009

(51) Int. Cl.
*G06F 12/08* (2006.01)

(52) U.S. Cl.
CPC .......... *G06F 12/082* (2013.01); *G06F 12/0813* (2013.01); *G06F 12/0815* (2013.01); *G06F 12/0822* (2013.01)

(58) Field of Classification Search
CPC ............ G06F 12/0813; G06F 12/0815; G06F 12/082; G06F 12/0822
USPC ......... 711/118–122, 124, 130, 141, 144–146, 711/E12.023, E12.026
See application file for complete search history.

(56) References Cited

U.S. PATENT DOCUMENTS

| 5,893,922 A | * | 4/1999 | Baylor et al. | 711/148 |
| 6,996,674 B2 | * | 2/2006 | Chiu et al. | 711/118 |
| 2005/0050398 A1 | * | 3/2005 | Rao et al. | 714/39 |

OTHER PUBLICATIONS

H. Yu et al., "The Costs and Limits of Availability for Replicated Services," Proceedings of the 18th ACM Symposium on Operating Systems Principles (SOSP), 2001, 14 pages.
J. Gwertzman et al., "World Wide Web Cache Consistency," Proceedings of USENIX, 1996, 12 pages.

* cited by examiner

*Primary Examiner* — Arpan P. Savla
(74) *Attorney, Agent, or Firm* — Mercedes L. Hobson; Ryan, Mason & Lewis, LLP (57) ABSTRACT

Techniques for maintaining consistent replicas of data are disclosed. By way of example, a method for managing copies of objects within caches, in a system including multiple caches, includes the following steps. Consistent copies of objects are maintained within the caches. A home cache for each object is maintained, wherein the home cache maintains information identifying other caches likely containing a copy of the object. In response to a request to update an object, the home cache for the object is contacted to identify other caches which might have copies of the object.

20 Claims, 6 Drawing Sheets

---

Cached object has a *home cache* (30)

- Home cache 30 typically accesses, updates object more frequently than other nodes do

- Normally has current version of object (or no copy of the object)

- Used to contact other caches 11 storing object

- Home cache 30 may vary dynamically depending on the workload

FIG. 1

20 — ■ Strong Consistency: no replica can be updated until all other replicas are invalidated
  - High overhead 21 — ■ Invalidation Messages: When an object is updated, invalidation messages are sent to caches containing copies of the object
  - New copy of object may be sent with invalidation message (prefetching)
  - Expiration times, heart beats can bound the amount of time an object can be obsolete in the event of failures 22 — ■ Expiration times: Objects have explicit expiration times after which they are no longer valid

23 — ■ Trade-off between level of consistency and performance
  - Stronger consistency generally results in more overhead

FIG. 2

**Cached object has a *home cache* (30)**

-Home cache 30 typically accesses, updates object more frequently than other nodes do -Normally has current version of object (or no copy of the object)

-Used to contact other caches 11 storing object

-Home cache 30 may vary dynamically depending on the workload

FIG. 3

- A cache 11 contains a directory (40) for cached objects

Directory entry (47) for o

| Key for o (45)<br><br>Value of o (41) and version number (42) |
|---|
| If cahce 11 is home cache 30 for o, caches 11 containing o (cahcelist(o) (43)).<br><br>Otherwise, home cahce 30 of o |
| updatestatus(o) (44): If o can be updated by any cahce 11, only home cache 30, or o is read-only |

METHODS AND SYSTEMS FOR CONSISTENTLY REPLICATING DATA

FIELD OF THE INVENTION

The present application relates to data processing systems and, more particularly, to techniques for consistently replicating data in such data processing systems.

BACKGROUND OF THE INVENTION

In data processing systems such as distributed computer systems wherein nodes comprise multiple memories, problems occur when it is desirable to access the same data by independent nodes. Multiple copies may be replicated across different nodes. However, problems occur when updates to the objects occur. Maintaining consistent replicas of the objects can be difficult.

By way of example only and not intended to be a comprehensive list, some types of distributed computing system that may experience this type of problem include Web-based systems, distributed memory multiprocessors, distributed file systems, and distributed databases. Those ordinarily skilled in the art associated with each of these exemplary systems will readily appreciate how maintaining consistent replicas of objects can be difficult.

There is thus a need to for techniques for maintaining consistent replicas of data.

SUMMARY OF THE INVENTION

Principles of the invention provide techniques for maintaining consistent replicas of data.

By way of example, in one aspect of the invention, a method for managing copies of objects within caches in a system comprised of multiple caches comprises the following steps. Consistent copies of objects are maintained within the caches. A home cache for each object is maintained, wherein the home cache maintains information identifying other caches likely containing a copy of the object. In response to a request to update an object, the home cache for the object is contacted to identify other caches which might have copies of the object.

The method may further comprise the steps of maintaining information on one of accesses and updates to an object, and using said information to select a home cache for the object.

Also, the method may also further comprise the step of selecting a cache n as a home cache for the object wherein said maintained information indicates that cache n frequently accesses or updates said object.

Further, the method may further comprise the step of, in response to said home cache identifying a cache n as likely containing a copy of said object, contacting cache n to one of invalidate and update its copy of said object.

Still further, the step of maintaining consistent copies of objects within the caches may further comprise using a plurality of methods for maintaining consistent copies of objects wherein different methods incur different trade-offs between a level of consistency and a level of overhead. The plurality of methods may comprise at least one of a strong consistency method, an invalidation messages without waiting for acknowledgements method, and an expiration times method.

These and other objects, features, and advantages of the present invention will become apparent from the following detailed description of illustrative embodiments thereof, which is to be read in connection with the accompanying drawings.

DETAILED DESCRIPTION OF THE PREFERRED EMBODIMENTS

Illustrative embodiments of the present invention will be described below in the context of a distributed data processing system, however, it is to be understood that principles of the invention are generally applicable to any system in which it would be desirable to maintain consistent replicas of data.

Figure 1:
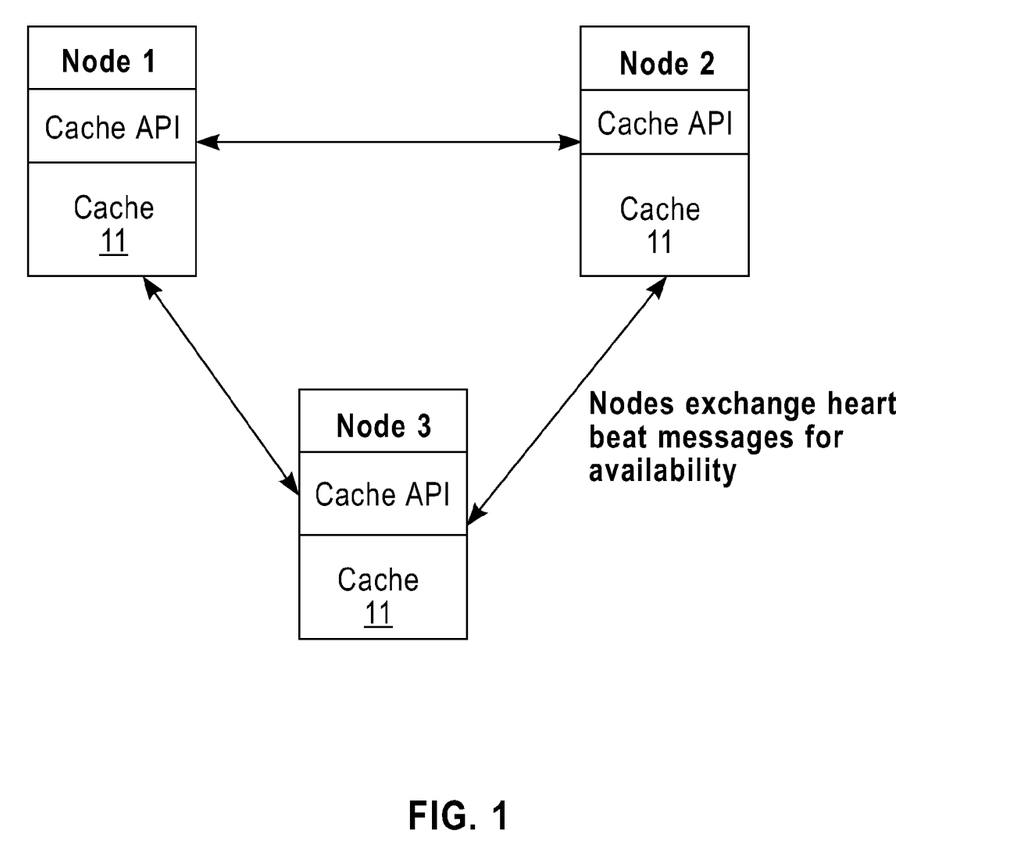
FIG. 1 shows a system within which techniques of the present invention may be implemented.

FIG. 1 depicts a system within which techniques of the present invention may be implemented. As shown, multiple caches 11 are storing objects. An object may be stored in multiple caches at the same time.

The term "cache" as used herein broadly refers to a memory or storage area within a computing system. A cache can include all or part of the main memory of a computing node. A cache can also include all or part of a persistent storage device, such as a disk.

The term "object" as used herein broadly refers to any entity which can be stored in a cache. By way of example only and not intended to be a comprehensive list, some types of such entities include Web pages, whole database tables, parts of database tables, files, and database query results.

The cache may optionally have an application programming interface (API) which allows application programs to explicitly control its content. In FIG. 1, each cache resides on a separate node (i.e., node 1, node 2, node 3). Several variations are possible within the spirit and scope of the invention. For example, multiple caches may exist on a same node. Different caches could be associated with different processes which may or may not be on the same node, etc.

Nodes and/or caches 11 may optionally exchange heart beat messages for maintaining availability information. Heart beat messages are sent at periodic intervals. If a node n1 fails to receive an expected heart beat message from node n2 at an appropriate time, it can conclude that there is a system failure; n2 may be down. Alternatively, there could be a network failure preventing n2 from properly sending messages to n1. After detecting a failure, the system can take appropriate recovery actions. A key point is that the use of heart beat messages at regular intervals allows failures to be detected in a timely fashion.

Figure 2:
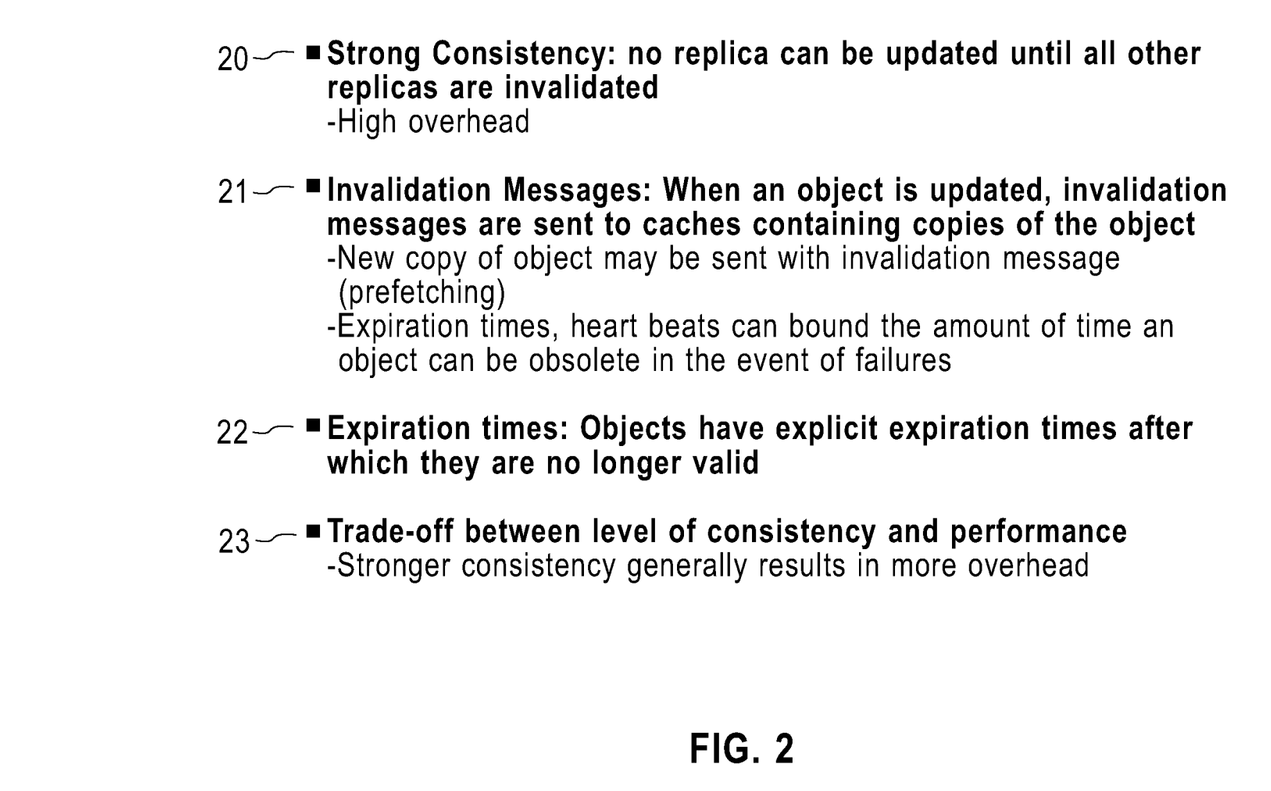
FIG. 2 shows different methods of maintaining consistency, according to embodiments of the present invention.

FIG. 2 summarizes different methods of maintaining consistency of objects with respect to multiple caches.

An approach (20) that would result in strong consistency would state that no replica (copy) of an object can be updated until after all other replicas are invalidated. However, this type of approach typically results in high overhead across the nodes and caches.

Another approach (21) would utilize invalidation messages such that, when an object is updated, invalidation messages are sent to caches containing copies of the object. This approach has the advantage that a new copy of the object may be sent with the invalidation message (a form of prefetching). Also, expiration times may be established by using the heart beats to bound the amount of time an object can be obsolete in the event of failures.

Yet another approach (22) would provide that objects have explicit expiration times after which they are no longer valid.

Still further, a trade-off approach (23) would trade off between the level of consistency and the level of performance; the trade-off being that stronger consistency generally results in more overhead.

The caches in the system shown in FIG. 1 could implement one of these approaches, or some other suitable approach. These approaches will be further discussed below in the context of step 64 of FIG. 6.

An object would typically have a home cache 30. The properties of home caches are summarized in FIG. 3. A home cache would typically access and/or update an object more frequently than other caches would. A home cache 30 for an object o would normally either have the most current version of o or not have a copy stored of o at all.

Figure 4:
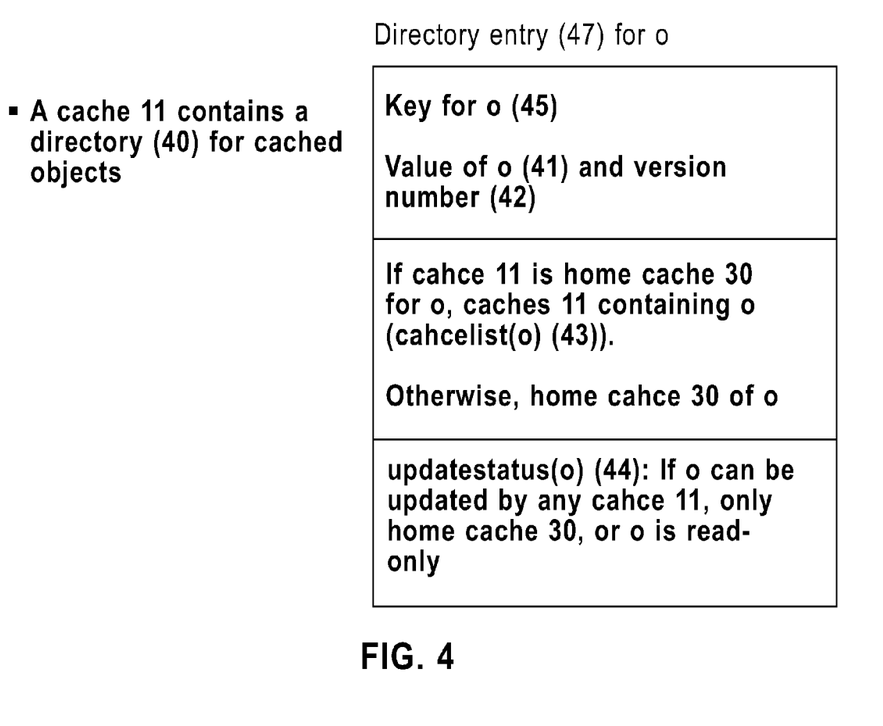
FIG. 4 shows a directory, according to an embodiment of the present invention.

As illustrated in FIG. 4, a home cache 30 of an object o maintains a list, referred to as cachelist(o) 43, which identifies other caches storing o. In some cases, cachelist(o) 43 would not be completely accurate; however, a cache identified by cachelist(o) 43 would normally have a greater than average probability of containing o.

A home cache 30 is used to contact other caches storing o via cachelist(o) 43.

Figure 3:
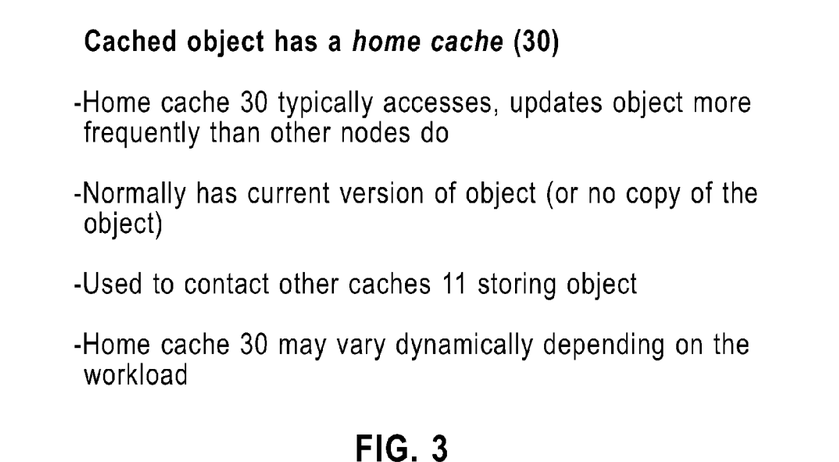
FIG. 3 shows home caches for objects, according to an embodiment of the present invention.

Statistics may be maintained on access and/or updates to object o to determine its home cache 30. In addition, the home cache 30 may vary depending on the access and/or updates to o.

As further depicted in FIG. 4, caches maintain directories 40 for cached objects. Cached objects are indexed by a key 45 identifying the object.

The directory 40 contains the value of a cached object o 41 and may optionally include a version number 42 for o. If the cache 11 is the home cache 30 for o, then the directory 40 also stores cachelist(o) 43 and a list of other caches 11 thought to be storing o. Otherwise, if the cache 11 is not the home cache 30 for o, then the directory 40 stores the home cache 30 of o.

The directory 40 may also store updatestatus(o) 44 which would indicate how o could be updated. For example, it may be possible for any cache 11 to update o. It may only be possible for the home cache 30 of o to update o. Object o may be read-only and hence not updatable.

Figure 5:
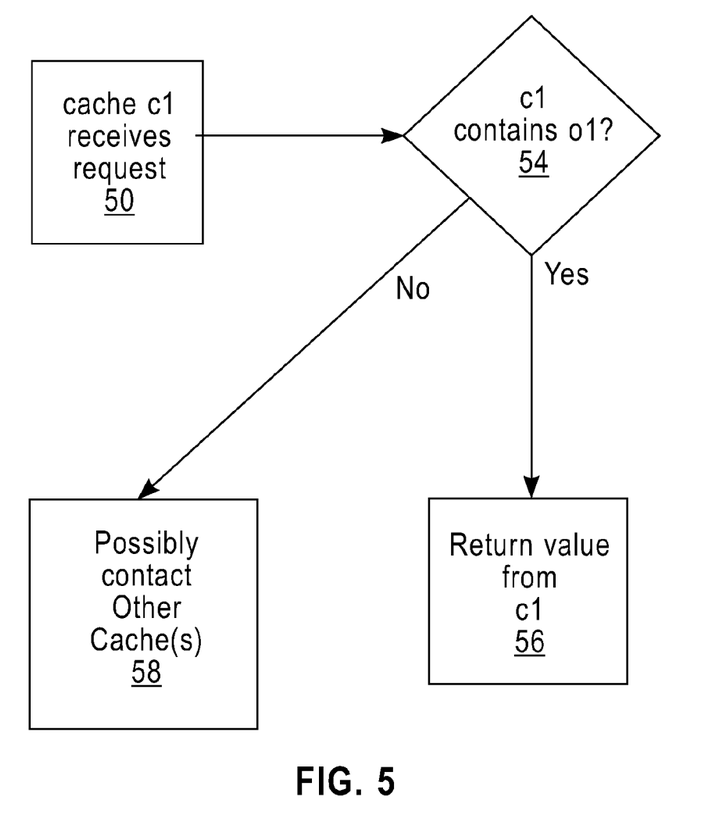
FIG. 5 shows a method for looking up an object, according to an embodiment of the present invention.

FIG. 5 depicts a method for looking up the value of an object o in a cache. In step 50, a request to return the value of an object o1 is received by a cache c1 (11). The request includes a key k1. In step 54, c1 determines if it has a copy of c1. It does so by searching for an object with a key 45 equal to k1. If c1 is located in step 54, then the value 41 of o is returned in step 56.

Otherwise, if o is not found in c1, then in step 58, the home cache 30 for o, h1, is determined. Note that it is possible for h1 to be c1. If h1 contains o, then the value 41 of o obtained from h1 is obtained. If h1 does not contain o, then cachelist(o) 43 is examined to see if o might be stored in another cache. Other caches on cachelist(o) 43 are examined until the value 41 of o is obtained. If the value 41 of o is not obtained after examining all caches on cachelist(o) 43, the system returns that o was not found.

In the event that a value of o is found in Step 58, c1 may optionally cache o.

A cache may become populated with objects in step 58 on cache misses. Alternatively, a cache may also be populated by explicitly adding objects to the cache using the cache API depicted in FIG. 1.

Figure 6:
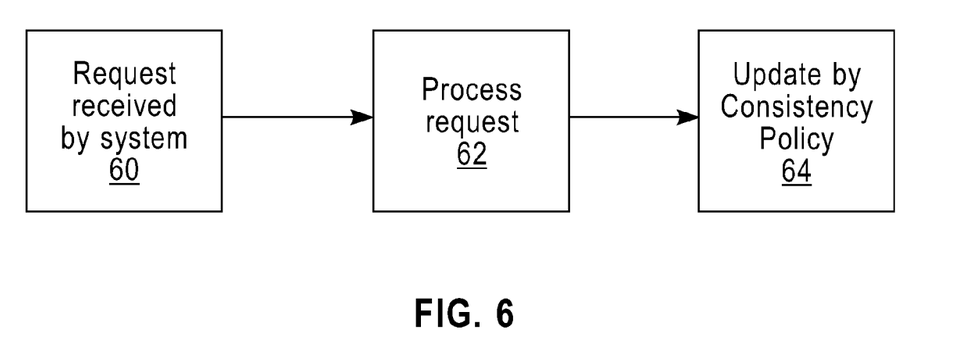
FIG. 6 shows a method for updating an object, according to an embodiment of the present invention.

A method for updating cached objects is depicted in FIG. 6. In step 60, a request to update an object would be received by a cache c1. The request would include a key k1 identifying the object and a new value v1 for the object.

In step 62, the request would be handled in one of multiple ways. The system would first look for k1 in the directory 40 for c1. If k1 is not found, the system would have the option of storing k1 in the system and assigning it an appropriate home cache 30, updatestatus 44, and storing the object in an initial set of caches. It could assign parameters for the object and select the initial set of caches based on parameters in the request and/or default values.

If k1 is found and corresponds to an object o, the system would determine how to proceed based on the updatestatus(o) 44 parameter. If updatestatus(o) 44 indicates that o is read only, o is not updated and step 62 returns with an appropriate return value.

If updatestatus(o) indicates that o can be updated by any cache, then c1 can perform the update. If updatestatus(o) indicates that o can only be updated by its home cache 30, then the home cache 30 for o must perform the update.

Let u1 be the cache assigned to perform the update in step 62. In step 64, u1 performs the update using one of several consistency policies. There are several possible consistency schemes that could be used. These include but are not limited to the following:

Strong consistency: All copies of an object stored in caches must be consistent. Before an object is updated, all previous copies need to be invalidated. That way, a cache will never serve an obsolete version of an object.

Invalidation messages without waiting for acknowledgements: A node/cache updating an object sends out invalidation messages to other caches which may be storing copies of the object. It is not necessary to wait for acknowledgements that the invalidations have taken place before updating the object.

Expiration times: objects have expiration times associated with them. A copy of an object should no longer be served after its expiration time has passed.

Features of different cache consistency methods are depicted in FIG. 2, discussed above.

In general, higher degrees of consistency result in more overhead and vice versa. Therefore, consistency policies can be made based on the degree of consistency required and the overhead an application is willing to tolerate. Strong consistency generally results in the most overhead but the highest degree of consistency.

Note that it is possible to tailor consistency policies to specific objects. Some objects need much higher levels of consistency than others. In addition, consistency policies can be based on the resources available to the system. If system resources are plentiful, then a stronger consistency policy can be applied. When system resources are scarce (e.g., it is desirable to reduce message traffic), a consistency policy which conserves resources (e.g., expiration times, in which lifetimes are not too short) may be desirable, even if this results in lower degrees of consistency.

In step 64, cachelist(o) 43 contained on the home cache 30 for o is used to identify caches storing o. That way, such caches can be updated in accordance with the consistency policy.

Figure 7:
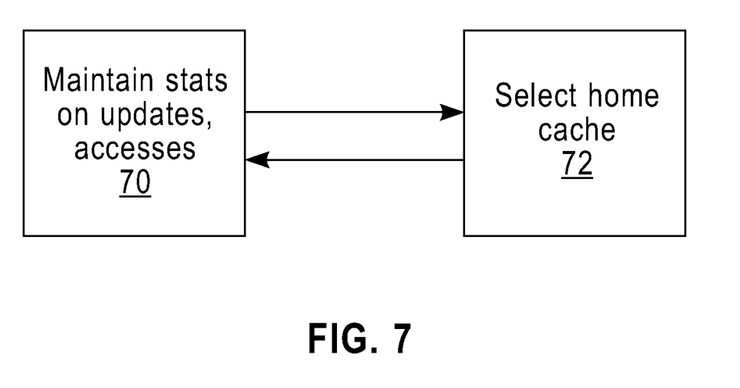
FIG. 7 shows a method for selecting a home cache for an object based on access and update patterns, according to an embodiment of the present invention.
Figure 9:
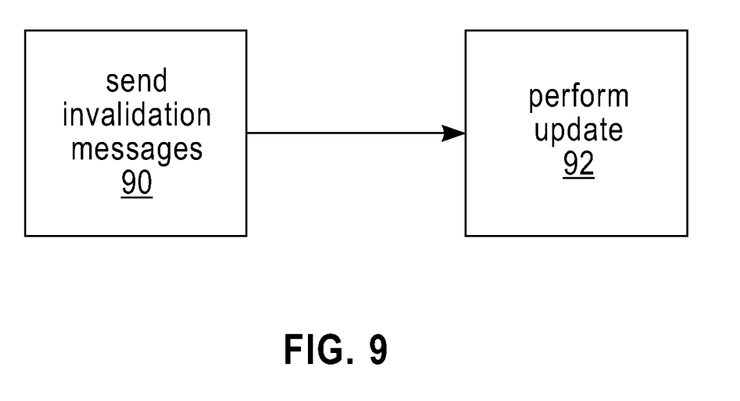
FIG. 9 shows a method for maintaining consistency using invalidation messages without waiting for acknowledgements, according to an embodiment of the present invention.
Figure 10:
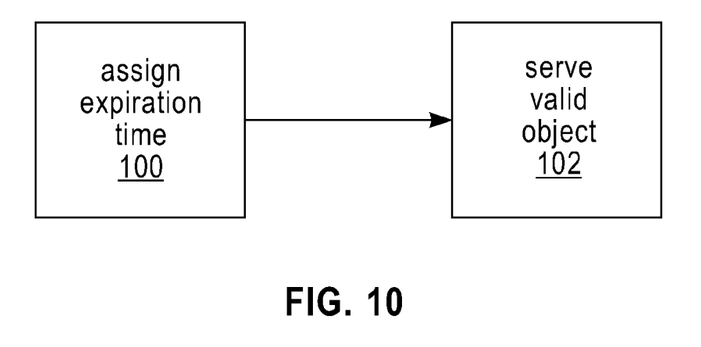
FIG. 10 shows a method for maintaining consistency using expiration times, according to an embodiment of the present invention.

Before describing how a home cache may be determined in the context of FIG. 7, we now describe a strong consistency approach (FIG. 8), an invalidation message approach (FIG. 9), and an expiration time approach (FIG. 10).

Figure 8:
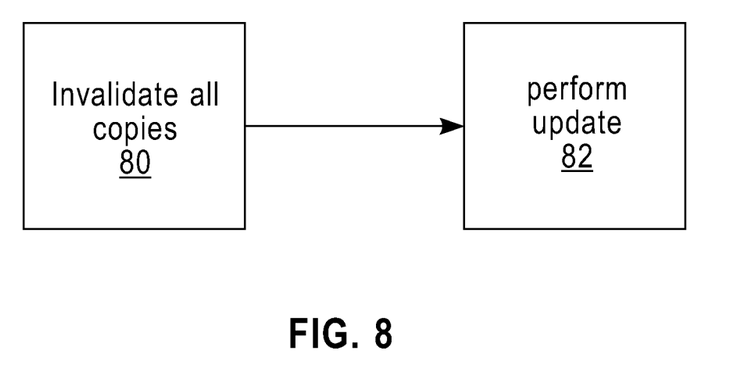
FIG. 8 shows a method for maintaining strong consistency, according to an embodiment of the present invention.

FIG. 8 depicts a method for updating an object o using strong consistency. Typically, a cache c1 would coordinate the updates. In step 80, messages are sent to all caches other than c1 likely containing a copy of o indicating that they should invalidate their copies of o. After c1 receives acknowledgements that all copies of o have been invalidated, it performs the update in step 82. Optionally, some other caches may receive the new value of o.

In step 80, caches are supposed to send acknowledgements to c1 after they invalidate their copy of o. Note that c1 may fail to receive an acknowledgement due to a cache and/or network failure. Failure detection schemes such as those based on heart beats can be used to bound the amount of time c1 needs to wait for acknowledgements. After a sufficient time out interval, c1 can proceed with an update even if it has not received all acknowledgements.

FIG. 9 depicts a method for updating an object o using invalidation messages without waiting for acknowledgements. Typically, a cache c1 would coordinate the updates. In step 90, messages are sent to all caches other than c1 likely containing a copy of o indicating that they should invalidate their copies of o. Cache c1 does not have to wait for acknowledgements that all copies of o have been invalidated before it performs the update in step 92. In some cases, c1 can send a new copy of the object along with the invalidation message. This introduces some additional overhead but allows a new object to be stored immediately in a cache, possibly eliminating a future cache miss for the object.

Objects may optionally have expiration times associated with them which would bound the time that an object would be obsolete in a cache due to a lost invalidation message.

FIG. 10 depicts a method for maintaining consistency using expiration times. In step 100, an expiration time is assigned to an object. In step 102, an object is only served if its expiration time has not elapsed. If a request is received for an obsolete object, the cache can query a remote source for a current version of the object. If the cache receives a current version (with an expiration time in the future), the cache can store the new copy of the object. The cache has the option of issuing a get-if-modified-since request for an object o whose expiration time has expired. The cache communicates with the source to determine if o has actually changed. If not, the cache merely needs the new expiration time for the object. If, on the other hand, o has changed, the cache needs to receive the new value of o.

Returning to FIG. 7, a method for determining a home cache 30 for an object o is shown. In general, the home cache 30 for an object should be located on a node which frequently accesses and/or updates the object. In many cases, the vast majority of accesses and updates to an object will be by a single node, n1. In that case, a cache c1 on n1 should be the home cache 30 for o. Most of the accesses and updates would be handled by c1. Only a small percentage of accesses and updates would be handled by caches on other nodes, since the other nodes access and update o much less frequently.

In step 70, the system maintains statistics on updates and accesses to an object, o1. In step 72, the home cache for o1 is determined based on these statistics. A home cache 30 is selected for o1 which resides on a node making many accesses and/or updates to o1. There are several specific methods for selecting a home cache for o1 within the spirit and scope of the invention, including but not limited to the following:

The home cache should be on a node with a greatest number of accesses to o1

The home cache should be on a node with a greatest number of updates to o1

The node corresponding to the home cache is selected using one of the previously mentioned metrics but weighting more recent accesses and updates more heavily than less recent ones.

The home cache should be on a node with a greatest value of z, where z is one of the following:

Sum of accesses and updates to o1

$Z=a*$(accesses to o1)$+b*$(updates to o1), where a and b are constants $Z=a*$(accesses to o1 in last c time units)$+b*$(updates to o1 in last c time units), where a, b, and c are constants. This formula only considers accesses/updates within the last c time units.

Let M be the number of times o was accessed in the last c time units.

Let N be the number of times o was updated in the last c time units. For all times $A_i$ corresponding to when o was accessed in the last c time units and all times $U_j$ corresponding to when o was updated in the last c time units, $$Z = \sum_{i=1}^{M} f(A_i) + \sum_{j=1}^{N} g(U_j)$$

where f and g are functions which assign higher or equal values to more recent times.

Note that step 72 can be applied to dynamically change the home cache of o1 after it already has a home cache. This could occur if the patterns of accesses and updates to o1 change, making a new home cache a better choice. A key feature of this invention is the ability to change the home cache 30 of an object in response to a change in workload. The new home cache will correspond to a node which frequently accesses and/or updates the object.

Figure 11:
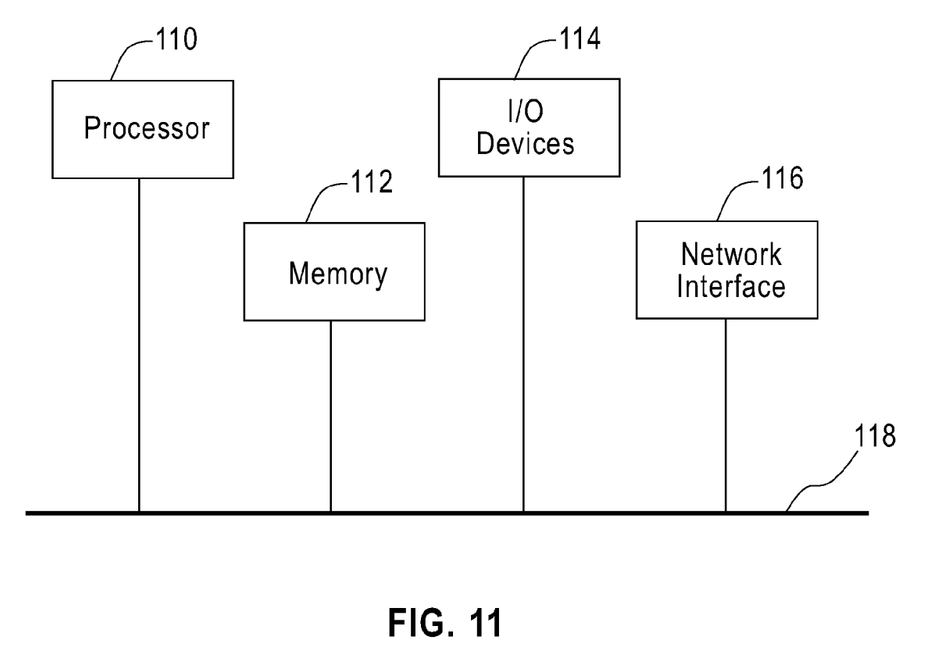
FIG. 11 shows a computing system within which techniques of the present invention may be implemented.

A data processing system suitable for storing and/or executing program code such as the computing system shown in FIG. 11 may include at least one processor 110 coupled directly or indirectly to memory element(s) 112 through a system bus 118. The memory elements can include local memory employed during actual execution of the program code, bulk storage, and memories which provide temporary storage of at least some program code to reduce the number of times code is retrieved from bulk storage during execution. Input/output or I/O device(s) 114 (including but not limited to keyboards, displays, pointing devices, etc.) may be coupled to the system either directly or through intervening I/O controllers. Network interface(s) 116 may be included to enable the data processing system to become coupled to other data processing systems or remote printers or storage devices through intervening private or public networks. Modems, cable modem, and Ethernet cards are just a few of the currently available types of network adapters.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices. Thus, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

It is to be understood that one or more of the nodes and caches shown in FIG. 1 could be implemented via the computing system shown in FIG. 11.

Further, it is to be understood that while the methods described herein for managing objects across multiple caches can be implemented in one or more of the nodes of the data processing system on which the caches reside, a separate dedicated computing system (e.g., as shown in FIG. 11) that is coupled to each cache and/or node could implement the management methods described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for managing copies of objects within caches in a system comprised of multiple caches, the method comprising the steps of:
    maintaining consistent copies of cached objects within the caches;
    selecting a home cache for each cached object, wherein for any two cached objects, the home cache for each of said two cached objects is allowed to be different, wherein the home cache of a cached object maintains information identifying other caches likely containing a copy of the cached object; and
    in response to a request to update an object, contacting the home cache for the object to identify other caches which might have copies of the object.

2. The method of claim 1, further comprising the steps of:
    maintaining information on one of accesses and updates to an object; and
    using said information to select a home cache for the object.

3. The method of claim 1, further comprising the step of selecting a cache n as a home cache for the object wherein said maintained information indicates that cache n frequently accesses or updates said object.

4. The method of claim 1, further comprising the step of, in response to said home cache identifying a cache n as likely containing a copy of said object, contacting cache n to one of invalidate and update its copy of said object.

5. The method of claim 1, wherein said step of maintaining consistent copies of objects within the caches further comprises using a plurality of methods for maintaining consistent copies of objects wherein different methods incur different trade-offs between a level of consistency and a level of overhead.

6. The method of claim 5, wherein said plurality of methods comprises at least one of a strong consistency method, an invalidation message without waiting for acknowledgements method, and an expiration times method.

7. An article of manufacture for managing copies of objects within caches in a system comprised of multiple caches, the article comprising a non-transitory computer readable storage medium containing one or more programs, which when executed by a computer implement the steps of claim 1.

8. A method for managing copies of objects within caches in a system comprised of multiple caches, the method comprising the steps of:
    selecting a home cache for each cached object, wherein for any two cached objects, the home cache for each of said two cached objects is allowed to be different, wherein the home cache of a cached object maintains information identifying other caches likely containing a copy of the cached object;
    maintaining information on one of accesses and updates to an object;
    using said information to select a home cache for the object; and
    in response to a request to update an object, contacting the home cache for the object to identify other caches which might have copies of the object.

9. The method of claim 8, further comprising the step of using a plurality of methods for maintaining consistent copies of objects wherein different methods incur different trade-offs between a level of consistency and a level of overhead.

10. The method of claim 8, further comprising the step of selecting a cache n as a home cache for the object wherein said maintained information indicates that n frequently accesses or updates said object.

11. The method of claim 8, further comprising the step of, in response to said home cache identifying a cache n as likely containing a copy of said object, contacting cache n to one of invalidate and update its copy of said object.

12. The method of claim 9, wherein said plurality of methods for maintaining consistent copies of objects includes at least one of a strong consistency method, an invalidation messages without waiting for acknowledgements method, and an expiration times method.

13. The method of claim 8, further comprising the step of exchanging heart beat messages between caches to maintain availability information.

14. The method of claim 8, further comprising the step of modifying a home cache for an object in response to changes in said maintained information on one of accesses and updates.

15. The method of claim 10, wherein the step of selecting a cache n as a home cache further comprises:
    calculating, for the object o1 and a plurality of caches, $Z=a*(\text{accesses to o1})+b*(\text{updates to o1})$, where a and b are constants; and
    selecting a home cache with a greatest value of Z.

16. The method of claim 10, wherein the step of selecting a cache n as a home cache further comprises:
    calculating, for the object o1 and a plurality of caches, $Z=a*(\text{accesses to o1 in last c time units})+b*(\text{updates to o1 in last c time units})$, where a, b, and c are constants; and
    selecting a home cache with a greatest value of Z.

17. The method of claim 10, wherein the step of selecting a cache n as a home cache further comprises:
calculating, for the object o1 and a plurality of caches, $$Z = \sum_{i=1}^{M} f(A_i) + \sum_{j=1}^{N} g(U_j)$$

where M equals the number of times o was accessed in the last c time units, N equals the number of times o was updated in the last c time units, $A_i$ represents times when o was accessed in the last c time units, $U_i$ represents times when o was updated in the last c time units, and f and g are functions which assign higher or equal values to more recent times; and
selecting a home cache with a greatest value of Z.

18. An article of manufacture for managing copies of objects within caches in a system comprised of multiple caches, the article comprising a non-transitory computer readable storage medium containing one or more programs, which when executed by a computer implement the steps of claim 8.

19. A system, comprising:
two or more caches;
wherein the system manages copies of cached objects within the two or more caches by:
maintaining consistent copies of cached objects within the two or more caches;
selecting a home cache for each cached object, wherein for any two cached objects, the home cache for each of said two cached objects is allowed to be different, wherein the home cache of a cached object maintains information identifying other caches of the two or more caches likely containing a copy of the cached object; and
in response to a request to update an object, contacting the home cache for the object to identify other caches which might have copies of the object.

20. A system, comprising:
two or more caches;
wherein the system manages copies of cached objects within the two or more caches by:
selecting a home cache for each cached object, wherein for any two cached objects, the home cache for each of said two cached objects is allowed to be different, wherein the home cache of a cached object maintains information identifying other caches likely containing a copy of the cached object;
maintaining information on one of accesses and updates to an object;
using said information to select a home cache for the object; and
in response to a request to update an object, contacting the home cache for the object to identify other caches which might have copies of the object.

\* \* \* \* \*